UNITED STATES PATENT OFFICE.

JOHN F. WOOD, OF EVERETT, MASSACHUSETTS.

IMPROVEMENT IN COMPOSITION COVERS FOR COAL-HOLES.

Specification forming part of Letters Patent No. 133,513, dated November 26, 1872.

*To all whom it may concern:*

Be it known that I, JOHN F. WOOD, of Everett, in the State of Massachusetts, have invented an Improved Cover for a Coal-Hole; and I do hereby declare the following to be a full and correct description of the same.

The object of this invention is to make a cover for a coal-hole in sidewalks or other pavement, which shall have all the strength of a cover made of iron, but which shall not wear slippery.

To make this cover I first reduce to a powder slate or other suitable stone, and then—following the instructions set forth in the several Letters Patent of the United States granted Stanislas Sorel for improvements in the manufacture of artificial stone and cements for the same, viz., Letters Patent No. 53,092, dated March 16, 1866; Letters Patent No. 100,944, dated March 15, 1870; and Letters Patent No. 100,945, dated March 15, 1870—I use oxide of magnesium as a base, and mix with it, in a dry state, the said powder, substantially in the manner indicated in the first of the above-named patents, and afterward moisten the mixture, as in said patent directed, with chloride of magnesium, or with any of the equivalents thereof, as set forth in the last of the above-named patents; or the oxide and chloride of zinc may be substituted for the oxide and chloride of magnesium in the manufacture, in which case I mix and incorporate with the said powder, in a dry state, from about ten to about twenty per cent. in weight of the oxide of zinc, and moisten the mixture with chloride of zinc until it will hold the shape given it by compressing in the hand. In whichever way prepared the moistened mixture is then molded to the required form by direct pressure or tamping. After a short time it will sufficiently harden without the application of heat.

I prefer as a filling to be used with the cements, as above described, a powder reduced from slate, since it may be used in a fine state, and so produce a stone cover which shall be smooth to handle, and at the same time not slippery; but other stones may be selected which will not wear slippery; or a mixture of slate and other stones may be used.

A rim is prepared in the same manner as the cover, and permanently set in the pavement, the cover fitting within the rim in the ordinary manner; or a cover made as above described may be fitted directly in the stone or brick work of the pavement.

I claim—

As a new article of manufacture, a cover for a coal-hole, prepared substantially as described.

The above specification of my said invention signed and witnessed at Boston this 22d day of May, 1872.

JNO. F. WOOD.

Witnesses:
    WILLIAM W. SWAN,
    SAM. N. BATES.